United States Patent [19]

Batruni et al.

[11] Patent Number: 4,926,472
[45] Date of Patent: May 15, 1990

[54] REDUCTION OF SIGNAL PROCESSING REQUIREMENTS IN A 2B1Q-CODE ECHO CANCELLER OR EQUALIZER

[75] Inventors: Roy G. Batruni, Fremont; Howard A. Wilson, Santa Clara, both of Calif.

[73] Assignee: National Semiconductor Corporation, Santa Clara, Calif.

[21] Appl. No.: 269,670

[22] Filed: Nov. 10, 1988

[51] Int. Cl.$^5$ .............................................. H04B 3/23
[52] U.S. Cl. .................................... 379/411; 370/32.1
[58] Field of Search ..................... 371/43; 375/39, 42, 375/17; 379/410, 411, 406; 370/32, 32.1

[56] References Cited

U.S. PATENT DOCUMENTS 4,785,445 11/1988 Guidoux ............................ 370/32.1

OTHER PUBLICATIONS

"Microprocessor Implementation of High-Speed Data Modems", Van Gerwen et al., IEEE Transactions on Communications, vol. COM-25, No. 2, Feb. 1977, pp. 238–250.

"High-Pass Filter Location in 2BiQ Transceivers", P. F. Adams, American National Standards Institute Telecommunications Committee, Doc No. Tidl. 3/86–193, 8, Oct. 1986, pp. 1–6.

Bitmead, Robert R., "Persistence of Excitation Conditions and the Convergence of Adaptive Schemes", *IEEE Transactions on Information Theory*, IT-30:2 (3/84), pp. 183–191.

Widrow, Bernard, "Adaptive Filters", *Aspects of Network and System Theory*, (1970), pp. 563–587.

Primary Examiner—Jin F. Ng
Assistant Examiner—Randall S. Vaas
Attorney, Agent, or Firm—Limbach, Limbach & Sutton

[57] ABSTRACT

The present invention provides a technique for data detection signal processing for removing echo interference and/or distortion from a received 2B1Q coded signal. According to the preferred technique, the received 2B1Q signal Q, where q=(−3, −1, +1, +3), is shifted one bit to the left to generate a corresponding shifted symbol alphabet S, where S=(−2, 0, +2, +4). The shifted received signals are then processed through a transversal filter. That is, the signal is provided to a delay line which is tapped at intervals corresponding to the symbol width of the received signal. Each tap along the delay line is connected through an amplifier to a summing device that provides an output y(n), where $$y(n) = \sum_{j=0}^{N} s(n-j)a_j.$$

The tap gains, or coefficients $a_j$, are set to subtract the effects of interference from symbols that are adjacent in time to the desired symbol. In an adaptive embodiment of the invention, the output y(n) resulting from the convolution between the transmitted symbols s(n) and the gain coefficients $a_j$. The output of the transmission channel and the filter output y(n) are then processed in accordance with a convergence algorithm to develop an error feedback signal which is used to update the gain coefficients $a_j$.

12 Claims, 7 Drawing Sheets

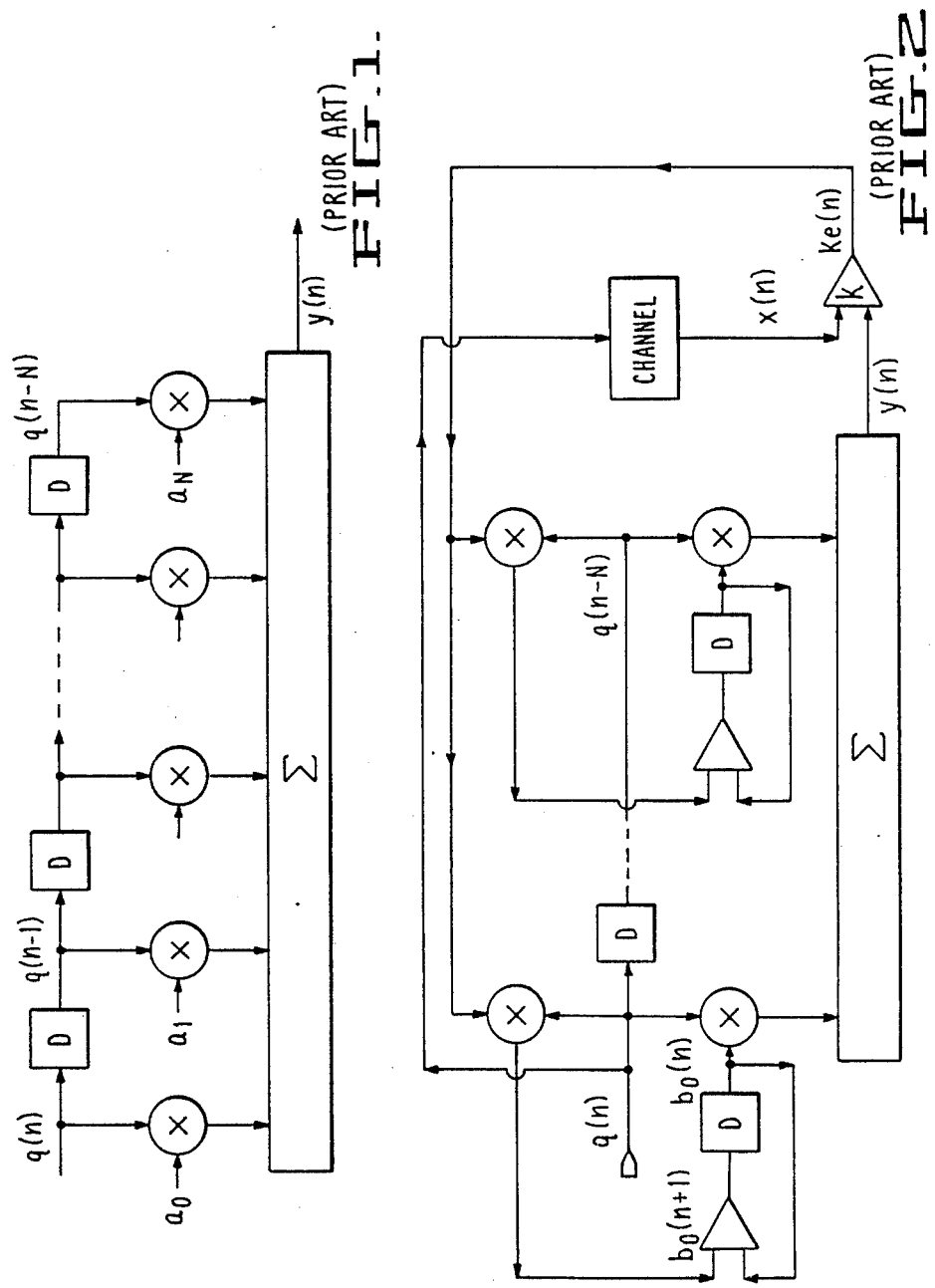

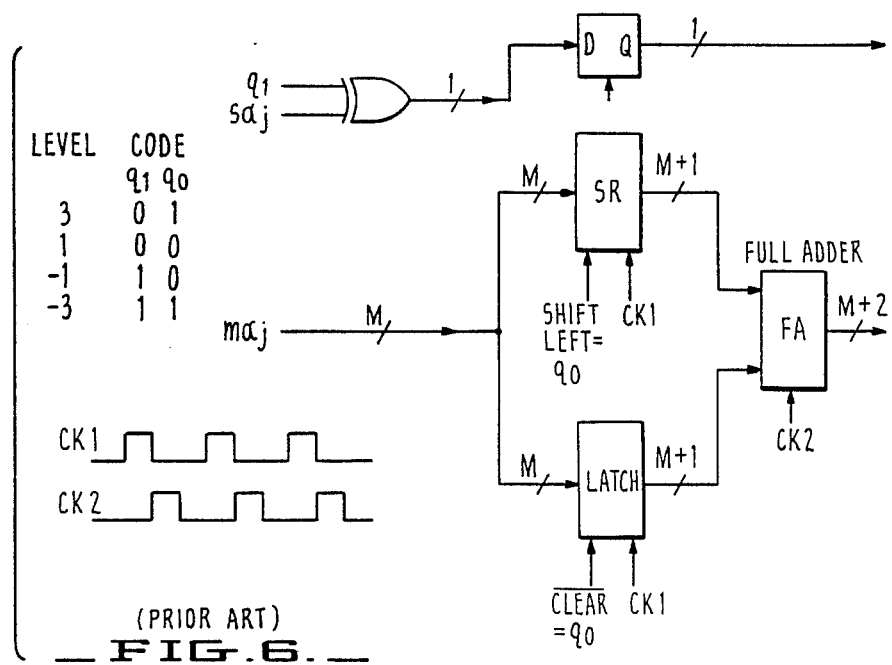
(PRIOR ART)
_FIG.6._
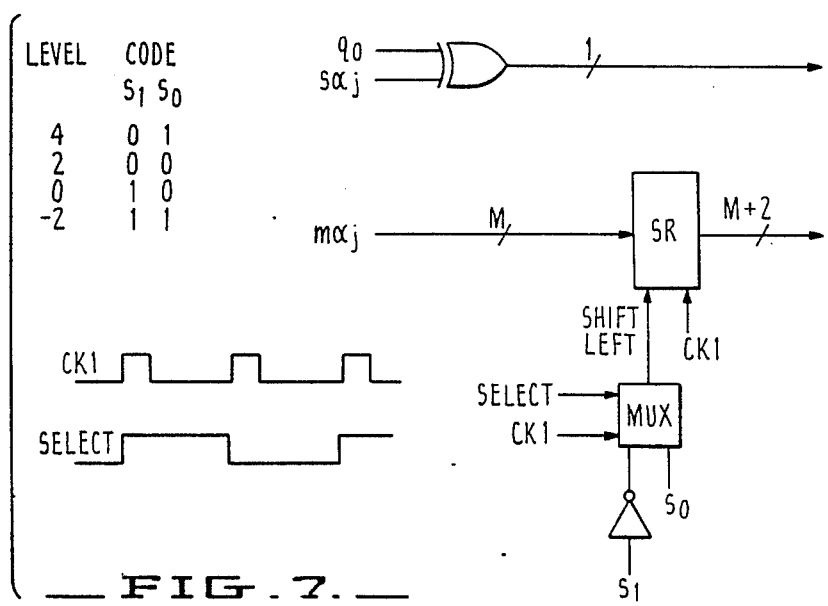
_FIG.7._

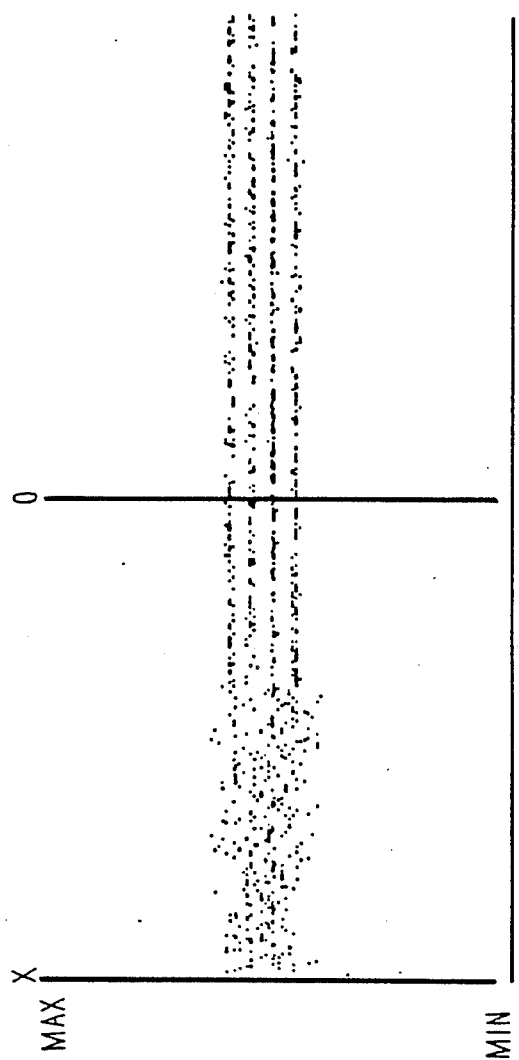

REDUCTION OF SIGNAL PROCESSING REQUIREMENTS IN A 2B1Q-CODE ECHO CANCELLER OR EQUALIZER

BACKGROUND OF THE INVENTION

1. Field of the Invention

The present invention relates to telecommunications systems and, in particular, to a method for simplifying the signal processing requirements for transmission of 2B1Q coded signals.

2. Discussion of the Prior Art

In high-speed data transmission applications over telephone twisted pair cable, the requirement for a low error rate is essential to the stable operation of the communications channel. When digital data is transmitted at a high rate over a telephone line, the main impairments are attenuation, dispersion and crosstalk noise. In addition, when signal transmission is fully duplex, the echo signal originating from the transmitter interferes with the data being received.

An example of a high speed data transmission application is the digital subscriber loop in the evolving Integrated Services Digital Network (ISDN).

The required data transmission rate over digital subscriber lines in the ISDN is 160 kbits/sec. To improve ISDN data transmission performance against the impairments mentioned above, the data to be transmitted is coded into a bandwidth-reducing format before it is transmitted.

Different modulation techniques can be employed to reduce the bandwidth of a transmitted signal. The modulation technique adopted in the United States by the American National Standards Institute (ANSI) for use over the digital subscriber line is called 2B1Q line coding. 2B1Q coding is a technique whereby a binary input sequence is transformed into a quaternary sequence by amplitude modulating pairs of bits in the binary stream of data.

According to the 2B1Q coding technique, successive pairs of binary data B=(0,1) are one-to-one mapped onto corresponding units of quaternary symbols Q=(−3, −1, +1, +3) and then transmitted as a corresponding voltage level at half the rate of the binary sequence. Therefore, an incoming binary data stream B with a bit rate of 160 kbit/sec is converted into a quaternary bit stream Q with a symbol rate of 80 kbit/sec and then transmitted. The conventional mapping rule from the binary data format to the 2B1Q data format is provided in Table 1 below.

TABLE 1

| Binary B | Quaternary Q |
|---|---|
| 00 | +1 |
| 01 | +3 |
| 10 | −1 |
| 11 | −3 |

The signal processing that is performed on a 2B1Q transmission in the data detection process is intended to remove echo interference in the received signal that is generated by the transmitter and to remove the distortion in the received signal itself. The former filtering task is referred to as echo cancellation and the latter is known as equalization.

Both echo cancellation and equalization filtering functions utilize a similar structure in that they can be performed by the same hardware configuration. One such configuration is the linear transversal filter. The following discussion of both the conventional method for performing echo cancellation/equalization and of the data coding technique of the present invention is based on the assumption that equalization is essentially the same as echo cancellation, but with a different input signal to its filter.

In the ISDN, the transmitted signal couples to the telephone twisted pair cable via a transformer, while the same transformer couples the twisted pair cable and the receiver. Therefore, an interference path exists between the transmitter and the receiver that causes every symbol that is transmitted to "echo" back into the receiver. Hence, the term "echo path" is used to identify the transfer function from the transmitter to the receiver at the same end of the digital subscriber line.

A conventional non-adaptive linear transversal filter of the type shown in FIG. 1 can be used to model the echo path. It performs the convolution between the transmitted signal, e.g. 2B1Q symbols q(n), where Q=(−3, −1, +1, +3), and the filter's individual tap gain coefficients $a_j$, to arrive at an output y(n), where $$y(n) = \sum_{j=0}^{N} q(n-j)a_j$$

and where the coefficients $a_j$ are samples of the echo pulse response of length N+1.

As shown in FIG. 1, a conventional non-adaptive linear transversal filter consists of a delay line which is tapped at intervals corresponding to the symbol width. Each tap along the delay line is connected through an amplifier to a summing device that provides the filter output y(n). The tap gains, or coefficients $a_j$, are set to subtract the effects of interference from symbols that are adjacent in time to the desired symbol. As stated above, this transversal filter structure can be used as an echo canceller, acting as an echo predictor and cancelling the transmitter-to-receiver coupling.

In practice, due to the slow time variability of the echo path, and more importantly, due to the unknown initial values for the tap gain coefficients $a_j$, an adaptive filter is required for echo cancellation and equalization.

Adaptive filters are frequently constructed as transversal, or tapped delay-line filters. A typical adaptive filtering application, shown in FIG. 2, involves driving a channel with an unknown impulse response with a known input signal q(n). The output of the channel at time n is given by the convolution sum y(n). In adaptively tracking the channel output, the adaptive filter produces an output x(n) which is the result of the summing of the tapped delay line outputs. Being time variable, the adaptive filter tap gain coefficients $a_j$ are iteratively updated based on a convergence algorithm which operates on the channel output y(n) and the filter output x(n) to develop an error feedback signal Ke(n) to the adaptive filter. Through a number of iterations, convergence of the channel output x(n) and the filter output y(n) is brought within acceptable limits.

In the case of both non-adaptive and adaptive filtering, the transfer function performs the convolution between the transmitted 2B1Q signals q(n) and the filter's delay line tap gains $a_j$ to arrive at the filter output y(n), where $$y(n) = \sum_{j=0}^{N} q(n-j)a_j$$

Because the symbols q(n-j) equal the transmitted 2B1Q code Q=(−3, −1, +1, +3), every multiplication operation in the convolution summation can potentially involve either a $+3a_j$ term or a $-3a_j$ term. Implementing multiplication of these terms requires splitting the product $3a_j = 2a_j + a_j$. Thus, compared with $2a_j$ multiplication for example, which is a basic left shift in binary arithmetic, implementation of $3a_j$ multiplication requires either more clock cycles or a faster clock with an associated increase in power consumption.

SUMMARY OF THE INVENTION

The present invention provides an efficient signal processing technique for removing echo interference and/or distortion from a received 2B1Q coded signal. According to the preferred technique, the received 2B1Q signal Q=(−3, −1, +1, +3) is shifted one bit to the left to generate a corresponding shifted symbol alphabet S=(−2, 0, +2, +4). The shifted symbols are then processed through a transversal filter. That is, the shifted signal is provided to a delay line which is tapped at intervals corresponding to the symbol width of the received signal. Each tap along the delay line is connected through an amplifier to a summing device that provides an output y(n), where $$y(n) = \sum_{j=0}^{N} s(n-j)a_j.$$

The tap gains, or coefficients $a_j$, are set to subtract the effects of interference from symbols that are adjacent in time to the desired symbol.

In an adaptive embodiment of the invention, the output y(n) results from the convolution between the transmitted symbols s(n) and the gain coefficients $a_j$. The output of the transmission channel and the filter output y(n) are then processed in accordance with a convergence algorithm to develop an error feedback signal which is used to iteratively update the tap gain coefficients $a_j$ until the convergence of the channel output and the filter output is brought within acceptable limits.

By shifting the conventionally coded 2B1Q to provide a new symbol alphabet comprising powers-of-two numbers, the multiplication operation in the convolution summation involves only $2a_j$ terms, rather than the potential $\pm 3a_j$ terms normally associated with 2B1Q signal processing.

To compensate for the symbol shifting, an additional DC tap is added to the filter. The additional tap is multiplied by a gain of 1 and subtracted from the shifted symbol convolution result to arrive at the desired result.

Therefore, the present invention provides faster processing of 2B1Q signals with negligible additional overhead.

These and other features and advantages of the present invention will be understood and appreciated by reference to the following detailed description of the invention which should be considered in conjunction with the accompanying drawings.

DESCRIPTION OF THE DRAWINGS

FIG. 1 is a schematic block diagram illustrating a conventional non-adaptive transversal filter for operation on a conventional 2B1Q signal.

FIG. 2 is a schematic block diagram illustrating a conventional adaptive transversal filter for operation on a conventional 2B1Q signal.

FIG. 6 is a schematic block diagram illustrating an implementation of a multiplier unit for the transversal filters shown in FIGS. 1 and 2 where the 2B1Q symbols are not shifted.

FIG. 7 is a schematic block diagram illustrating an implementation of a multiplier unit for the transversal filters shown in FIGS. 3 and 5 where the 2B1Q symbols are shifted.

FIG. 9 is a graph illustrating measured convergence of adaptive DFE with DC-shifted 2B1Q symbols.

DETAILED DESCRIPTION OF THE INVENTION

Figure 3:
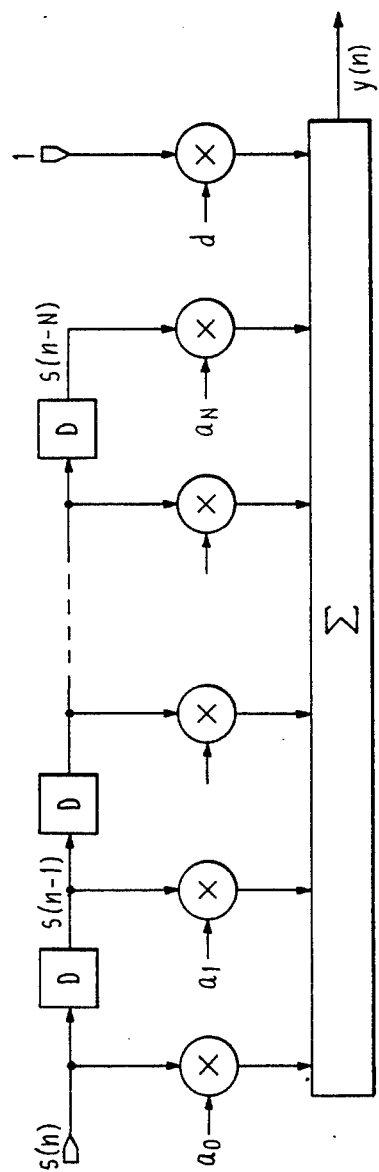
FIG. 3 is a schematic block diagram illustrating an adaptive transversal filter for operation on a 2B1Q symbol alphabet shifted by +1 in accordance with the present invention.

In a non-adaptive linear transversal filter of the type shown in FIG. 1, the conventional echo path transfer function performs the convolution between transmitted 2B1Q coded signals q(n) and the filter's delay line tap gain coefficients $a_j$ to arrive at an output y(n) according to the following summation $$y(n) = \sum_{j=0}^{N} q(n-j)a_j \quad (1)$$

where the coefficients $a_j$ are samples of the echo pulse response of length N+1.

If the echo canceller structure is non-adaptive, as is the case on the FIG. 1 embodiment, then optimal performance can be achieved only when its tap gain coefficients are equal to those of the echo path Since, for 2B1Q signals, the symbols q(n-j) equal the transmitted 2B1Q code Q=(−3, −1, +1, +3), then every multiply operation in the convolution summation can involve either a $+3a_j$ term or a $-3a_j$ term. Implementing multiplication of these terms requires splitting the product into an addition as follows, $$3a_j = a_j + 2a_j. \quad (2)$$

In the multiplication process, the $2a_j$ term involves only a 1-bit left shift and can be considered negligible overhead in the product. Therefore, if the $2a_j$ term were the only one that needed to be considered, then an N+1 coefficient filter that has N+1 multiply operations and N+1 add operations would be equivalent to 2(N+1) add operations.

Thus, in accordance with the present invention, to eliminate the multiplication by 3 typically associated with 2B1Q signal processing, the following equations should be considered:

$$x(n) = \sum_{j=0}^{N} q(n-j) a_j \quad (3)$$

$$= \sum_{j=0}^{N} (q(n-j) + 1 - 1) a_j$$

$$= \sum_{j=0}^{N} (q(n-j) + 1) a_j - \sum_{j=0}^{N} a_j$$

Thus, every symbol s(n-j) is shifted in level by 1. Therefore, let $$q(n-j) + 1 = s(n-j) = S = (-2, 0, 2, 4) \quad (4)$$

and;

$$\sum_{j=0}^{N} a_j = d \quad (5)$$

where "d" is the DC component of the echo path. If the receiver includes a high-pass filter, and since it is part of the echo path, then d=0.

With the new symbols s(n-j), $$x(n) = \sum_{j=0}^{N} s(n-j) a_j - d \quad (6)$$

The structure of a non-adaptive filter in accordance with the present invention is shown in FIG. 3. It comprises the conventional transversal filter delay line tapped at intervals corresponding to the symbol width. Each tap along the delay line is connected through an amplifier to a summing device that provides the filter output. Additionally, as discussed in greater detail below, the delay line includes an additional DC tap to compensate for the symbol shift.

Thus, in accordance with the present invention, a new symbol alphabet S is provided that consists of a "0" symbol and powers-of-two symbols. The mapping rule from conventional 2B1Q coded data to the new symbol alphabet S is provided in Table 2 below.

TABLE 2

| Binary B | Quaternary Q | Shifted Symbol S |
|---|---|---|
| 00 | +1 | +2 |
| 01 | +3 | +4 |
| 10 | −1 | 0 |
| 11 | −3 | −2 |

Utilizing this new coding alphabet, every multiply operation in the convolution process is now either a do-nothing (0), a 1-bit left shift (symbols −2 and 2) or a 2-bit left shift (symbol 4). The shift operation has negligible overhead on the signal processing. An additional DC tap in the delay line is multiplied by a constant coefficient of 1 and, therefore, also has negligible overhead as a multiply operation. This results in a convolution process that only requires N+2 additions. Furthermore, if a high-pass filter is included in the receiver, i.e., d=0, then only N+1 additions are needed.

It should be understood that the shifting of the symbols is not physically performed by adding a "1" to each new symbol entering the echo canceller EC. Rather, each of these "new" symbols is interpreted as a "−2" if its transmitted value is −3, as a "0" if its transmitted value is −1, as a "2" if its transmitted value is 1, or as a "4" if its transmitted value is +3. The modifications to the conventional filter architecture that are required so that the filter interprets the conventional 2B1Q signals as the shifted symbols S will be obvious to those skilled in the art.

Figure 4:
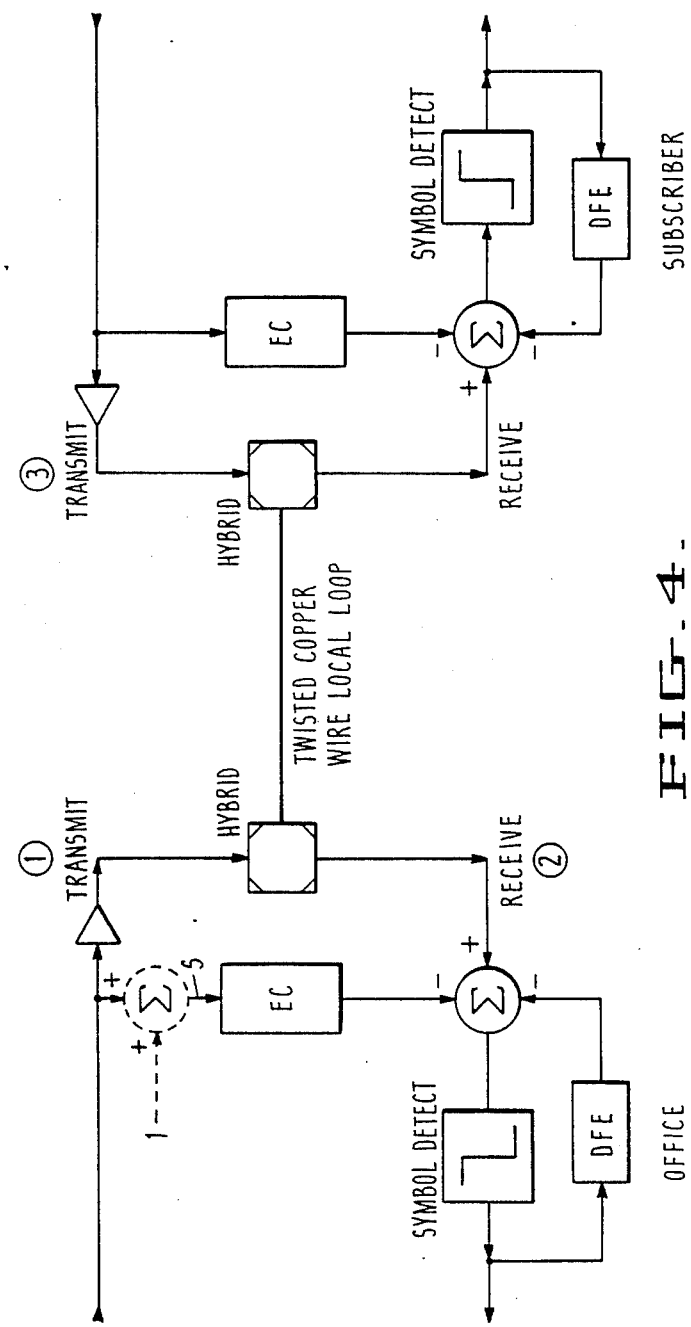
FIG. 4 is a schematic block diagram illustrating an example of full duplex communication where adaptive transversal filters are used.

That is, as shown in FIG. 4 in dashed lines, an imaginary adder forces the echo canceller EC to "see" the conventional 2B1Q symbols as shifted by 1, i.e. as the symbols S. Consequently, the conventional data manipulation shown in FIG. 6 is replaced with that shown in FIG. 7.

Since the symbol shifter is imaginary, whereas the re-arrangement of the data manipulation, as shown in a comparison of FIGS. 6 and 7, is real, the intended convolution result between the symbols and the coefficients is incomplete. The resulting error is the quantity d in Equation (5) above. To obtain the correct result, the quantity d is subtracted from the convolution result, as shown in Equation (6) and in FIG. 3.

Thus, considerable simplification in the signal processing requirements is achieved by allowing the echo canceller EC to interpret the symbol values as (−2, 0, 2, 4) instead of (−3, −1, 1, 3). As stated above, inside the echo canceller EC, a DC-shifting effect occurs, since the expected value of the symbol values is now 0.25(−2+0+2−4)=0.25×4=1; this DC-shifting effect is cancelled by the DC-tap.

The practical implementation of a full duplex communications device at 160 kbit/sec over a twisted pair cable requires both adaptive echo cancelation and equalization. As stated above, and as described by B. Widrow, "Adaptive Filters, I: Fundamentals", Stanford Electron. Lab., Stanford Univ., Palo Alto, Calif., Tech. Rep. 6764-6, December 1966, an adaptive filter 'adapts' its coefficients in a controlled manner with the objective of emulating a given channel response.

Referring to FIG. 4, the function of an echo canceller EC is to adaptively emulate the echo path, that is, the signal flow from point 1 to point 2. An adaptive decision feedback equalizer DFE emulates the far end signal path, that is, the signal flow from point 3 to point 2. The echo canceller EC and the decision feedback equalizer DFE have similar architectures and signal processing behavior. Therefore, the following discussion is restricted to the echo canceller EC.

Adaptive filters have been extensively studied. Their most critical aspect is convergence, meaning the ability to reach a stable steady state where the coefficients of the filter are as close as is desired to the coefficients of the channel being emulated. Conditions for and proof of convergence are given by Widrow (see above) and by R. R. Bitmead, "Persistence of Excitation Conditions and the Convergence of Adaptive Schemes", IEEE Trans. Information Theory, Vol. IT-30, No. 2, March 1984.

For a conventional filter at time n, the channel's (echo path) output is given by Equation 1 above. The channel output in the case of the shifted 2B1Q coding technique in accordance with the present invention is provided in Equation 6 above.

Let the adaptive filter (echo canceller) output be given by, $$y(n) = \sum_{j=0}^{N} s(n-j) \, b_j(n) - c(n) \tag{7}$$

where the s(n-j) terms are the data symbols S shifted in accordance with the present invention, the $b_j(n)$ terms are the time variable filter coefficients and c(n) is the time variable DC coefficient of the filter.

When convergence is achieved, $a_j = b_j(n)$ for all j and n, and d = c(n) for all n.

The echo canceller output cancels the channel output x(n), resulting in a cancellation error e(n), where $$e(n) = x(n) - y(n) = \left\{ \sum_{j=0}^{N} s(n-j)(a_j - b_j(n)) \right\} - (d - c(n)) \tag{8}$$

Let $$a_j - b_j(n) = a_j(n) \tag{9}$$

which is the time variable coefficient error, and let $$d - c(n) = \delta(n) \tag{10}$$

be the time variable DC coefficient error.

Re-writing Equation 8

$$\begin{aligned} e(n) &= \left( \sum_{j=0}^{N} q(n-j) \, a_j(n) \right) + \\ & \quad \sum_{j=0}^{N} (a_j - b_j(n)) - (d - c(n)) \\ &= \left( \sum_{j=0}^{N} q(n-j) \, a_j(n) \right) + \left( \sum_{j=0}^{N} a_j \right) - d - \\ & \quad \left\{ \left( \sum_{j=0}^{N} b_j(n) \right) - c(n) \right\} \end{aligned} \tag{11}$$

From Equation 5, $$\sum_{j=0}^{N} a_j - d = 0$$

Therefore, $$e(n) = \left( \sum_{j=0}^{N} q(n-j) \, a_j(n) \right) - \left( \sum_{j=0}^{N} b_j(n) \right) + c(n) \tag{12}$$

Let $A' = (a_0 \ldots a_N - d)$ (13)

$B'(n) = (b_0 \ldots b_N - c(n))$ (14)

$S'(n) = (s(n) \ldots s(n-N) \, 1)$ (15)

$Q'(n) = (q(n) \ldots q(n-N) \, 0)$ (16)

$V' = (1 \, 1 \ldots 1)$ (17)

$$P' = VV' = \begin{vmatrix} 1 & 1 & \ldots & 1 \\ 1 & 1 & \ldots & 1 \\ \cdot & & & \\ \cdot & & & \\ \cdot & & & \\ 1 & 1 & \ldots & 1 \end{vmatrix} \tag{18}$$

$$\begin{aligned} \Omega'(n) &= (A - B(n))' \\ &= (\delta_0(n) \ldots \delta_N(n) \, (-d + c(n))) \end{aligned} \tag{19}$$

where $\delta_j(n) = a_j - b_j(n)$. (20)

In Equations 13 to 19, the ' character denotes transposition, and all the vectors are $1 \times (N+2)$. From the Widrow Algorithm (see reference above) for updating the tap gain coefficients, $$\Omega(n+1) = \Omega(n) - k \, e(n) \, S(n) \tag{21}$$

where k is a positive constant chosen to control stability of convergence and steady state residual error e(n). The error e(n)

$$e(n) = \Omega'(n) \, S(n) = S'(n) \Omega(n) \tag{22}$$

from Eqn. 21 and 22, $$\begin{aligned} \Omega(n+1) &= \Omega(n) - k \, (S(n) \, S'(n)) \, \Omega(n) \\ &= \{ I - k \, (S(n) \, S'(n)) \} \, \Omega(n) \end{aligned} \tag{23}$$

where I is the identity matrix. Equation 23 is in a form identical to the adaptive filter convergence problem described by Widrow and Bitmead and conditions on k for convergence of $\Omega(n)$ to 0 as n tends to infinity are derived there.

Expanding on Equation 23, $$\Omega(n+1) = \{ I - k(Q(n)Q'(n)) - k(Q(n)V' + VQ'(n)) - kP \} \, \Omega(n) \tag{24}$$

taking expected values conditional $\Omega(n)$, $$E \, (Q(n)Q'(n) \, / \, \Omega(n)) = \begin{vmatrix} R & O \\ O & O \end{vmatrix} \tag{25}$$

where R = 5, I is the auto-correlation matrix of 2B1Q.

$$E \, (Q(n)V' + VQ'(n) \, / \, \Omega(n)) = 0 \tag{26}$$

and this is true since $E \, (Q(n) \, / \, \Omega(n)) = 0$. Therefore, $$\Omega^*(n+1) = \left( I - k \begin{vmatrix} R & O \\ O & O \end{vmatrix} - kP \right) \Omega(n) \tag{27}$$

where * denotes expected value. From Equations 19, 27 and 18, it is known that the $(N+2)$'th element of $\Omega^*(n+1)$ is $$-d + c^*(n+1) = (-d + c(n)) - k \, (-d + c(n)) - k \sum_{j=0}^{N} \delta_j(n)$$

Therefore, $$c^*(n+1) = c(n) + k \left\{ \left( \sum_{j=0}^{N} b_j(n) \right) - c(n) \right\} \tag{28}$$

which means that the average correction or update to the DC-tap is independent of d, which is a fictitious quantity in the channel anyway, but depends only on the error between the canceller DC and the canceller DC-tap. Therefore, the canceller DC-tap tracks and cancels the DC introduced by the convolution of the DC-shifted data s(n-j) with the canceller taps and has very little to do with the channel DC.

The convergence proof of this algorithm is no different than the regular least mean squares (LMS) algorithm that does not use DC shift in the data. This is because Equation 23 satisfies the criterion that the $(N+2)\times(N+2)$ matrix $M=(I-k\ S(n)S'(n))$ has one eigenvalue $\lambda=(I-KS'(n)S(n))$ with eigenvector $S(n)$, and (N1) eigenvalues $\lambda=1$ with eigenvectors forming the basis for the null space of $S'(n)$. Therefore, for convergence stability, with adequate choice of k such that matrix product M'M is positive, definite and contractive, the contraction from $\Omega(n)$ to $\Omega(n+1)$ is in the direction of $S(n)$ and orthogonal to $S'(n)$. The details of the proof are provided by Bitmead (see reference above).

As an example of this last point, consider a 3-tap echo canceller. Let $s(n)=4$, $s(n-1)=-2$ and let $k=1/32$. Then $$S'(n) = (4\ -2\ 1)$$

$$M = \begin{vmatrix} 0.5 & 0.25 & -0.125 \\ 0.25 & 0.875 & 0.0625 \\ -0.125 & 0.0625 & 0.96875 \end{vmatrix}$$

The eigenvalues and eigenvectors are, $$\lambda_1 = 1 - kS'(n)S(n) = 0.34375$$

$$v'_1 = S'(n) = (4\ -2\ 1)$$

$$\lambda_2 = \lambda_3 = 1$$

$$v'_2 = (1\ 1.6\ -0.8)$$

$$v'_3 = (1\ -0.5\ -5)$$

Note that $S'(n)_2\ v = S'(n)_3\ v = 0$.

Note that the DC shift of the symbols could be a $-1$ instead of the $+1$, as proposed. The analysis for this case is similar to the $+1$ case except that every DC coefficient is inverted in sign and the shifted symbol alphabet is $(2,0,-2,-4)$.

Figure 5:
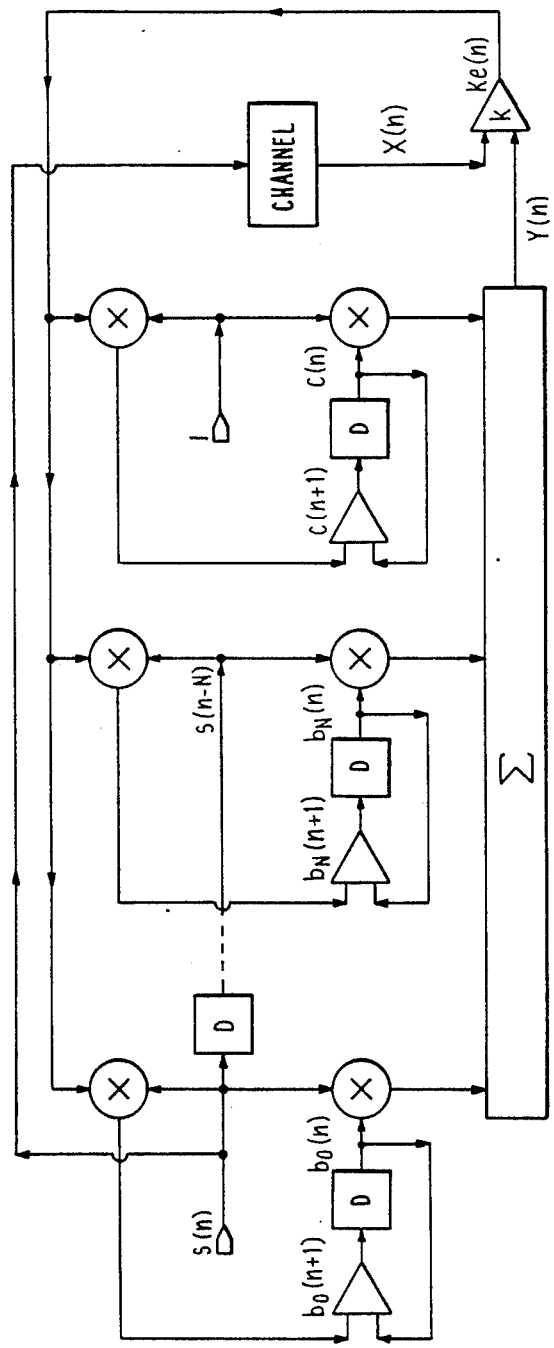
FIG. 5 is a schematic block diagram illustrating a non-adaptive transversal filter for operation on a 2B1Q symbol alphabet shifted by +1 in accordance with the present invention.

Architectures for a non-adaptive filter using an unshifted symbol alphabet and one using the shifted alphabet in accordance with the present invention are shown in FIGS. 1 and 3, respectively. For the adaptive implementation, the architectures are shown in FIGS. 2 and 5, respectively.

As discussed above, an additional tap always appears in the filters using the shifted alphabet. The input of this tap is fixed at level $s=1$. Primarily, the shifted-data symbols implementation of the present invention gains an advantage in complexity and speed due to the construction of its multiplier units. Examples of these multipliers for a conventional 2B1Q filter and a shifted-alphabet filter are shown in FIG. 6 and FIG. 7, respectively.

Referring to FIG. 6, let the coefficient $a_j$ be divided into a sign bit $sa_j$ and M magnitude bits $ma_j$. Assume sign-magnitude notation. If $q_0=0$, then the latch output is 0 and the shift register SR shifts by 0 places. The coefficient magnitude $ma_j$ is unchanged. If $q_0=1$, then the output of the latch equals its input and the shift register SR output equals its input shifted by 1 bit left. The adder then adds $(2ma_j+ma_j)=3ma_j$.

Referring to FIG. 7, the multiplexer alternately selects $s_1$, then $s_0$ and shifts if either is 1.

| | |
|---|---|
| When $s_1s_0 = 01$ | level 4, there are two left shifts. |

| -continued | |
|---|---|
| When $s_1s_0 = 10$ | level 0, there are no shifts. |
| When $s_1s_0 = 00$ or $11$ | level 2 or $-2$, there is 1 left shift. |

Figure 8:
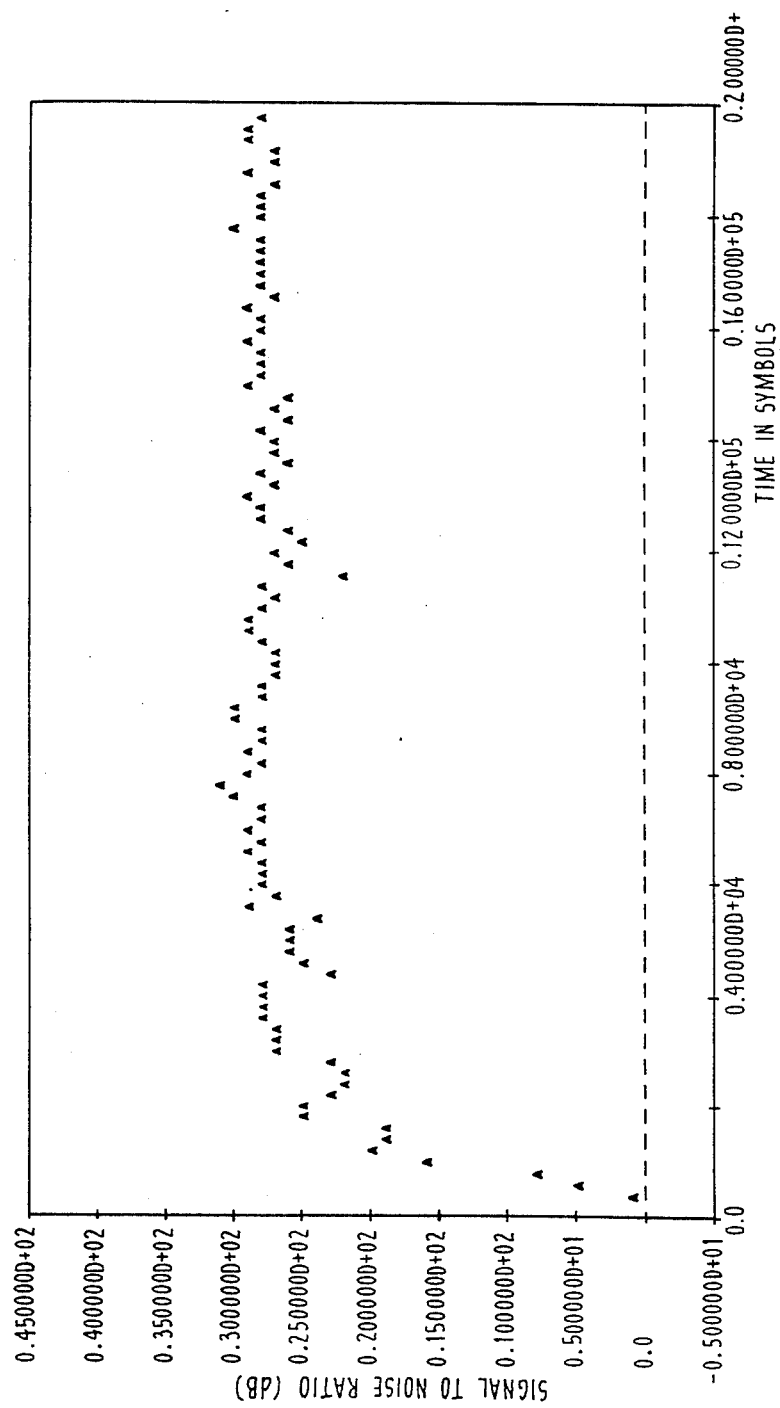
FIG. 8 is a graph illustrating simulated convergence of adaptive DFE with DC-shifted 2B1Q symbols.

FIG. 8 shows a simulated signal to noise ratio (SNR) vs. time plot. FIG. 9 is a measured eye opening chronogram. Both situations utilize a 30-coefficient echo canceller and a 25 coefficient decision feedback equalizer.

It should be understood that the invention is not intended to be limited by the specifics of the above-described embodiment, but rather defined by the accompanying claims.

What is claimed is:

1. A signal processing method for a 2B1Q coded signal comprising 2B1Q symbols, the method comprising:
 (a) mapping the 2B1Q symbols to corresponding symbols of a new symbol alphabet to provide a new signal;
 (b) performing a convolution between the new signal and a plurality of gain coefficients to provide a plurality of amplified outputs;
 (c) summing the amplified outputs to provide a convolution result; and
 (d) subtracting an error factor from the convolution result to provide a compensated result that compensates for the mapping of the 2B1Q symbols to the new symbol alphabet.

2. A signal processing method for a 2B1Q coded signal comprising 2B1Q symbols, the method comprising:
 (a) mapping the 2B1Q symbols to corresponding symbols of a new symbol alphabet to provide a new signal, the new symbol alphabet comprising powers-of-two numbers;
 (b) providing the new signal to a transversal filter comprising a delay line that includes a plurality of delay line taps at intervals along the delay line corresponding to the symbol width of the new signal;
 (c) amplifying each delay line tap according to a corresponding gain coefficient to provide a plurality of amplified outputs;
 (d) summing the amplified outputs to provide a convolution result; and
 (e) subtracting an error factor from the convolution result to provide a compensated result that compensates for the mapping of the 2B1Q symbols to the new symbol alphabet.

3. A method as in claim 2 and including the further steps of
 processing the 2B1Q coded signal and the compensated result according to a convergence algorithm to develop an error feedback signal; and
 iteratively updating each gain coefficient based on the error feedback signal until the error feedback signal is with desired limits.

4. A method of data detection signal processing for removing echo interference and/or distortion from a received 2B1Q coded signal comprising 2B1Q symbols Q, where $Q=(-3, -1, +1, +3)$, the method comprising:
 (a) shifting the 2B1Q symbols of the received 2B1Q coded signal one bit to the left to generate a shifted signal comprising new corresponding symbols S, where $S=(-2, 0, +2, +4)$;

(b) providing the shifted signal to delay line which is tapped at intervals corresponding to the symbol width of the shifted signal;

(c) amplifying each tap along the delay line according to a corresponding gain coefficient $a_j$, the gain coefficients being set to subtract the effects of interference from shifted symbols that are adjacent in time to a corresponding 2B1Q symbol; and (d) summing the amplified delay line taps to provide an output y(n), where $$y(n) = \sum_{j=0}^{N} s(n-j)a_j.$$

5. A method as in claim 4 and including the further step of subtracting an error factor from the output y(n), the error factor compensating for the shifting of the 2B1Q symbols, to provide a compensated output.

6. A method as in claim 5 and including the steps of processing the 2B1Q coded signal and the compensated output according to a convergence algorithm to develop an error feedback signal; and updating the gain coefficients $a_j$ based on the error feedback signal.

7. Apparatus for processing a 2B1Q coded signal comprising 2B1Q symbols, the apparatus comprising:
   (a) means for mapping the 2B1Q symbols to corresponding symbols of a new symbol alphabet to provide a new signal;
   (b) means for performing a convolution between the new signal and a plurality of gain coefficients to provide a plurality of amplified outputs;
   (c) means for summing the amplified outputs to provide a convolution result; and
   (d) means for substracting an error factor from the convolution result to compensate for the mapping of the 2B1Q symbols to the new symbols.

8. A transversal filter for removing echo interference and/or distortion from a received 2B1Q coded signal comprising 2B1Q symbols, the transversal filter comprising:
   (a) means for interpreting the 2B1Q symbols as corresponding symbols of a new symbol alphabet to provide a new signal;
   (b) a delay line that includes a plurality of delay line taps at intervals along the delay line corresponding to the symbols width of the new signal;
   (c) means for amplifying each delay lien tap according to a corresponding gain coefficient to provide a plurality of amplified outputs;
   (d) means for summing the amplified outputs to provide a convolution result; and
   (e) means for substracting an error factor from the convolution result to provide a compensated result that compensates for the interpreting of the 2B1Q symbols.

9. A transversal filter as in claim 8 and further including means for substracting an error factor from the convolution result to provide a compensated result that compensates for the interpreting of the 2B1Q symbols.

10. A transversal filter as in claim 8 wherein the new symbol alphabet comprises powers-of-two numbers.

11. A transversal filter as in claim 8 and further including
    means for processing the 2B1Q coded signal and the compensated result according to a convergence algorithm to develop an error feedback signal; and
    means for iteratively updating each gain coefficient based on the error feedback signal until the error feedback signal is within desired limits.

12. An adaptive transversal filter for removing echo interference and/or distortion from a received 2B1Q coded signal comprising 2B1Q symbols Q, where Q=(−3 −1, +1, +3), the adaptive transversal filter comprising:
    (a) means for shifting the 2B1Q symbols of the received 2B1Q coded signal one bit to the left to generate a shifted signal comprising a new corresponding symbol alphabet S, where S=(−2, 0, +2, +4);
    (b) a delay line that includes a plurality of delay line taps at intervals along the delay line corresponding to the symbol width of the shifted signal;
    (c) means for amplifying each delay line tap according to a corresponding gain coefficient $a_j$ to provide a plurality of amplified outputs;
    (d) means for summing the amplified outputs to provide a convolution result;
    (e) means for substracting an error factor from the convolution result to provide a compensated result that compensates for the shifting of the 2B1Q symbols;
    (f) means for processing the received 2B1Q signal and the compensated result according to a convergence algorithm to develop an error feedback signal; and
    (g) means for iteratively updating each gain coefficient $a_j$ based on the error feedback signal until the error feedback signal is within desired limits.

* * * * *